April 28, 1959  S. FRANKFURT  2,883,999

TAPPING DEVICE

Filed July 26, 1955

INVENTOR.
SANDOR FRANKFURT
BY
Joseph R. Teagno
ATTORNEY

United States Patent Office 2,883,999
Patented Apr. 28, 1959

2,883,999

TAPPING DEVICE

Sandor Frankfurt, Cleveland Heights, Ohio, assignor to Champion Safe Tap Company, Cleveland, Ohio, a corporation of Ohio Application July 26, 1955, Serial No. 524,550

3 Claims. (Cl. 137—170.1)

This invention relates to the tapping of kegs of beer or like beverage and more particularly to a novel form of draft tube, tap rod or conduit means.

Broadly the invention comprehends the provision of a tap rod, or liquid conduit means, for use in the siphoning of beer or the like from containers, such as beer keg, having valve means incorporated therein for inhibiting the retrograde flow of beer from the rod or conduit to the keg, said valve means being movable axially to open or closed position by the flow of beer in the rod.

Heretofore it has been customary to siphon beer from kegs by conduit means providing direct free flow communication between the beer drawing spigot or faucet with the consequence that spoilage, agitation and spillage of beer occurs. These disadvantages arise by reason of the fact that a quantity of beer will normally be contained in the conduit means. Spillage thus occurs in the removal of the conduit means from the keg wherein the beer in the conduit means runs out and is not only wasted but is also messy. Spoilage occurs by reason of the fact that should the beer in the conduit means remain unrefrigerated for too long a period of time, secondary fermentation will take place therein and be communicated to the beer in the keg. Agitation of the beer in the keg occurs when the spigot or faucet used in dispensing the beer is abruptly closed causing a hydraulic shock wave to travel back through the conduit means to the keg and act to drive carbon dioxide out of the beer.

The presently devised conduit means through the provision of a novel valve structure eliminates the aforesaid disadvantages of previous conduit means and insures the dispensing of fresh beer at all times.

Among the several objects of the invention is the provision of a conduit means or draft tube or rod for conducting beer or like beverages from the beverage container or keg to the beverage dispensing spigot or faucet including one way flow check valve means therein that, (a) Serves to isolate the beverage in the conduit means from the container from which it is drawn;

(b) Prevents hydraulic shock transmittal to the beverage container, thus insuring against agitation thereof;

(c) Prevents jet flow tending toward excessive foaming of the beverage being dispensed;

(d) Prevents beverage spillage in the removal of the conduit means from the beverage container;

(e) Prevents spoilage of the beverage in its container due to secondary fermentation which might occur in the conduit means; and (f) Permits of the easy removal of the valve means for the cleaning, repair or replacement thereof.

Other objects and advantages of the invention will be apparent from the following description and drawings forming a part hereof and wherein.

Figure 1:
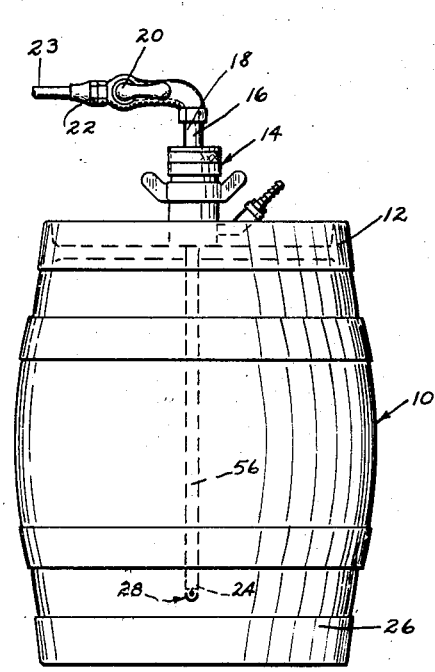
Fig. 1 is an elevation view of a beer keg having associated therewith a beer conduit means or draft tube or rod embodying my invention.
Figure 2:
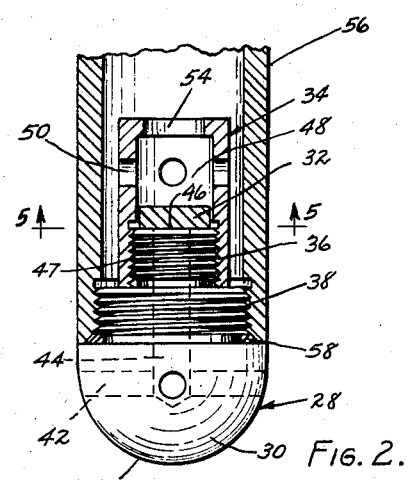
Fig. 2 is an enlarged fragmentary view of the inner end of my conducting means forming a part of the structure of Fig. 1.
Figure 4:
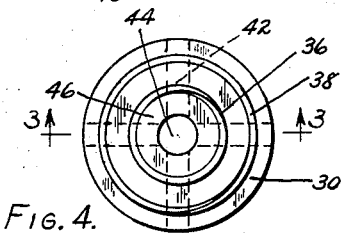
Fig. 4 is an end view taken substantially along lines 4—4 of Fig. 3.
Figure 5:
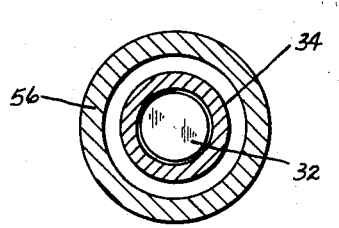
Fig. 5 is a cross-sectional view taken substantially along lines 5—5 of Fig. 2.
Figure 3:
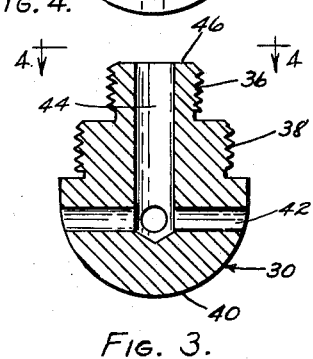
Fig. 3 is a cross-sectional view of the end tip of the structure of Fig. 2.

Referring to the drawings for more specific details of the invention 10 represents generally a beer keg of conventional design, having a bung-hole or aperture in its head 12 through which the beer is withdrawn. Mounted in the opening of the keg is a tapping device 14 of the type disclosed by Patent No. 2,681,238 and a draft tube or conducting means 16 which extends through the tapping device 14 into the keg. Gas under pressure is adapted to be fed from a suitable source, not shown, through the tapping device to the interior of the keg, whereby pressure is placed on the beer in the keg.

Draft tube 16 serving to conduct beer from the keg to a point for dispensing thereof remote from the keg includes a passageway therethrough controlled at one end 18 removed from the keg by a manually operable control valve 20 and provides a fitting 22 to which suitable hose or conduit 23 is connected for delivery of the beer to a suitable dispensing spigot or faucet, not shown. End 24 of tube 16 arranged adjacent the bottom 26 of the keg serves as the intake end of the tube and incorporates therein a valve mechanism 28.

Valve mechanism 28 is in the form of a unitary structure suitably secured by threading in the tube. Mechanism 28 comprises a main body portion 30, a flat disc valve 32 and a valve cage 34. Body portion 30 includes step externally threaded sections 36 and 38, a bullet nose end 40 and a plurality of communicating passages 42 and 44. Passages 42 which are shown as four in number are arranged in equi-circumferentially spaced array and extend radially of the body 30 into communication with one another centrally of the body 30 and axially spaced from the extremity of end 40 thereof. Passage 44 extends axially centrally in the body 30 through the sections 36 and 38 from a point of mutual communication with passages 42 to open communication at the end of section 36 adjacent a valve seating surface 46.

Valve cage 34, which is in the form of a perforated thimble, is provided internally on one open end thereof with threads 47, for mating securement upon threaded section 36 of the body 30, to provide a valve chamber 48 therein, adjacent valve seating surface 46 of body 30. A plurality of openings 50, four in number, are provided in the side wall 52 of the thimble and a central opening 54 opposite the threaded end 48 of the thimble is provided therein, the purpose of which will hereinafter appear.

Disc valve 32 is arranged in chamber 48 and is of a size to be freely movable in the chamber and to seat upon valve seating surface 46 of body 30 over the open end of passage 44. Valve 32 is of predetermined diameter and thickness as relates respectively to the size of opening 54 in cage 34 and the positioning of openings 50 so that upon movement thereof away from valve seating surface 46 it can occupy a position across opening 54 while at the same time permitting free communication between opening 50 and chamber 48.

The threaded section 38 of body 30 is adapted to have threading engagement upon an internally threaded portion of a tubular element or conduit 56 of draft tube 16, with an effective sealing provided therebetween adjacent axial abutting portions thereof by an annular resilient seal 58 disposed axially therebetween. It is to be further noted that with mechanism 28 arranged in conduit 56 that ample annular space is had between the external surface of cage 34 and the internal surface of conduit 56, thus assuring a free flow of beer from openings 50 of the cage to the internal confines of conduit 56.

It is essential for the provision of the free flow of beer through the valve mechanism, to thus prevent jet flow tending toward foaming of the beer to be dispensed at the spigot, that the combined flow area of passages 42, the combined flow area of openings 50 and the flow area of passage 44 be equal. Furthermore it is necessary that the flow area of opening 54 be greater than the combined flow area of openings 50 so that backflow pressure in conduit 56 will serve to immediately move the valve to seated position upon valve seating surface 46.

By so providing the valve mechanism with a bullet-nose profile an easy insertion of the draft tube through tapping device 14 is possible without causing damage to the sealing means therefor which are adapted to embrace the tube in its inserted position in the tapping device and keg. Furthermore it is to be observed that by arranging the passages 42 in valve mechanism 26, spaced from the nose end thereof, that the draft tube can be inserted into the keg with the nose 40 engaging the inner bottom surface of the keg without interference of communication between the interior of the keg and the passages 42.

With draft tube 16 arranged as disclosed in Fig. 1 within keg 10, with beer contained therein, and with pressure supplied to the keg through tapping device, an opening of the draft tube 16 by reason of moving valve 20 to open position and the actuation of the dispensing spigot or faucet for the delivery of beer as desired, the beer flows from keg 10, through passages 50, and 54, past valve 32, through chamber 48, openings 50 and conduit 56 for free flow to the point of dispensing thereof. Under these conditions of operation the pressure flow of beer serves to move valve 32 off of seat 46 to a position wherein it closes off opening 54 of the valve cage, while simultaneously completely uncovering openings 50 in the cage and provide for free flow from chamber 48 to the interior of conduit 56.

Immediately upon the shutting off of either the dispensing spigot or valve 20, a hydraulic surge or backflow occurs in the conduit means or draft tube whereupon the valve 32 is immediately moved axially from its position over opening 54 to a check valve seating position upon valve seating surface 46 over passage 44 to thus inhibit retrograde flow of the beer in conduit 56 to the keg. In so preventing this retrograde flow, agitation of the beer in the keg is prevented. The quick closing action of valve 32 over passage 44 is possible by reason of the backflow surge or pressure acting upon the valve surface exposed through opening 54. Since opening 54 is of an area greater than the combined area of openings 50, there is no chance of the valve being temporarily balanced or delayed in its movement to close off passage 44.

With the beer so held in draft tube 16, the tube can be easily and readily removed from the keg and tapping device without concern of spillage since the beer remains in the draft tube until it is desired to remove same.

Furthermore by reason of the valve mechanism isolating the beer in the draft tube from the keg, there is no possibility of spoilage of beer in the conduit means should secondary fermentation occur in the conduit means by reason of the beer remaining therein for prolonged periods of time without refrigeration.

In so providing the valve mechanism 26 as constituted by the assembled body, valve and cage, it is possible to readily service, clean or replace the parts thereof so as to insure the efficient and effective functioning thereof at all times.

While the invention is disclosed as embodied in a specific form of conduit means and as applied for use to a specific draft system, it will be readily apparent to those skilled in the art that it is applicable to other conducting means or draft systems for serving a like purpose and in its basic concept constitutes a specific valve incorporated liquid conducting means for beer and like beverages adapted to be dispensed from kegs or like containers under pressure applied thereto, as defined by the appended claims.

What I claim is:

1. In combination with a draft tube for use in drawing pressurized beverages, a valve mechanism for removable insertion in the draft tube in one end thereof comprising a body having a part received within the tube and a part extending axially beyond the tube externally thereof having flow passage means extending therethrough, a valve cage secured upon a portion of the part of the body secured in the tube and providing therewith a valve chamber, said valve cage having its side wall inward annularly spaced from the inner wall of the tube to provide an annular passage therebetween, and a valve supported for movement in the cage, said cage having first passage means in the side wall thereof of substantially equal flow area to the passage means in the body and second passage means in the end wall thereof, opposite axially disposed from the body, of greater flow area than the first passage means, and said valve being movable to close the passage means in the body for one axial position of movement and to close off the second passage means in the cage for an opposite axial position of movement.

2. A valve mechanism according to claim 1 wherein the valve is a flat disc, wherein the first passage means are located axially intermediate the second passage means and the passage means in the body and wherein the axial distance between the first and second passage means is at least substantially equal to the thickness of the valve.

3. In combination with a draft tube for use in drawing pressurized beverages, a valve mechanism for removable insertion in the draft tube in one end thereof comprising a body having a part received within the tube and a part extending axially beyond the tube externally thereof having flow passage means extending therethrough, a valve cage secured upon a portion of the part of the body secured in the tube and providing therewith a valve chamber, said valve cage having its side wall inward annularly spaced from the inner wall of the tube to provide an annular passage therebetween, and a valve supported for movement in the cage, said cage having first passage means in the side wall thereof and second passage means in the end wall thereof disposed axially opposite from the body, and of greater flow area than the first passage means, and said valve being movable to close the passage means in the body for one axial position of movement and to close off the second passage means in the cage for an opposite axial position of movement.

References Cited in the file of this patent

UNITED STATES PATENTS

| | | |
|---|---|---|
| 1,251,281 | Price | Dec. 25, 1917 |
| 1,269,616 | Bozec | June 18, 1918 |
| 1,962,771 | Hornaday | June 12, 1934 |
| 2,331,001 | Simon | Oct. 5, 1943 |
| 2,509,130 | Burks | May 23, 1950 |
| 2,731,027 | Daun | Jan. 17, 1956 |

FOREIGN PATENTS

| | | |
|---|---|---|
| 655,711 | Great Britain | Aug. 1, 1951 |